United States Patent
Lach et al.

(10) Patent No.: US 9,210,977 B2
(45) Date of Patent: *Dec. 15, 2015

(54) DEVICE FOR RETAINING A PORTABLE ELECTRIC COMPONENT

(71) Applicant: THUMBS-UP, INC., Springfield, MO (US)

(72) Inventors: William H. Lach, Springfield, MO (US); Heath A. Doty, Webster Groves, MO (US); Donald J. Fedorko, St. Louis, MO (US)

(73) Assignee: THUMPS-UP, INC., Springfield, MO (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/933,901

(22) Filed: Jul. 2, 2013

(65) Prior Publication Data

US 2013/0292270 A1    Nov. 7, 2013

Related U.S. Application Data

(63) Continuation of application No. 13/085,598, filed on Apr. 13, 2011, now Pat. No. 8,490,789.

(51) Int. Cl.
*B65D 25/24* (2006.01)
*B65D 5/52* (2006.01)
(Continued)

(52) U.S. Cl.
CPC .............. *A45C 11/00* (2013.01); *G06F 1/1626* (2013.01); *A45C 2011/002* (2013.01); *A45C 2200/15* (2013.01); *G06F 2200/1633* (2013.01)

(58) Field of Classification Search
CPC ... B65D 5/5206; B65D 2207/00; F16M 11/12

USPC ......... 206/320, 305, 701, 724, 557, 562, 564, 206/565, 45.2, 45.24, 45.28; 248/688, 248/176.1, 176.3, 188.91, 188.8, 145.6, 248/346.06, 917, 309.1, 310; 361/679.01; 455/575.1, 575.8; 40/719, 745, 747, 40/748, 750

See application file for complete search history.

(56) References Cited

U.S. PATENT DOCUMENTS 8,118,274 B2    2/2012    McClure et al.
8,152,113 B2    4/2012    Chen et al.
(Continued)

OTHER PUBLICATIONS

Microsoft, Attack of the Show: Apple Experts' Thoughts on iPhone 4, http://www.bing.com/videos/watch/video/appel-experts-thoughts-on-iphone website, Jun. 8, 2010.

(Continued)

*Primary Examiner* — Jacob K Ackun
*Assistant Examiner* — Rafael Ortiz
(74) *Attorney, Agent, or Firm* — Bryan Cave LLP

(57) ABSTRACT

A device capable of retaining a portable electronic component includes a frame having a front surface and a rear surface and a handle coupled to the rear surface of the frame, wherein the handle is movable between a retracted position and a plurality of extended positions with respect to the rear surface of the frame along an axis of rotation that is horizontally offset from a vertical centerline of the frame. The rear surface of the frame may include a recessed handle receiving well having a depth capable of housing a portion of the handle in its retracted position. The handle may have a depth dimension approximately equal to the handle receiving well of the rear surface of the frame such that the handle in its retracted position is generally flush with the rear surface of the frame.

26 Claims, 11 Drawing Sheets

(51) Int. Cl.
*A45C 11/00* (2006.01)
*G06F 1/16* (2006.01)

(56) References Cited

U.S. PATENT DOCUMENTS

| | | |
|---|---|---|
| 2006/0021889 A1 | 2/2006 | Kim |
| 2009/0218454 A1 | 9/2009 | Stanley |
| 2010/0059649 A1 | 3/2010 | Buxton |
| 2010/0072334 A1* | 3/2010 | Le Gette et al. ......... 248/176.3 |
| 2010/0096284 A1 | 4/2010 | Bau |
| 2010/0124040 A1 | 5/2010 | Diebel et al. |
| 2010/0142130 A1 | 6/2010 | Wang et al. |
| 2010/0142175 A1 | 6/2010 | Cheng et al. |
| 2010/0240421 A1 | 9/2010 | Sekora et al. |
| 2011/0036965 A1 | 2/2011 | Zhang et al. |
| 2012/0106054 A1 | 5/2012 | Royz et al. |
| 2012/0145843 A1* | 6/2012 | Ho et al. ................. 248/176.3 |
| 2012/0261288 A1 | 10/2012 | Lach et al. |

OTHER PUBLICATIONS

Perpetual Kid, iPlunge Phone Stand, http://www.perpetualkids.com/iplunge-phone-stand website 2012.
Burns Computer Services & Handholder Products, Inc., Universal Tablet Holder, http://www.handeholder.com website 2011.
Zerochroma LLC, Zerochroma, Change your Point of View, http://www.zerochroma.com/mobile website 2010.
Speck Products, SmartFlex View for iPhone 4S/4, http://www.speckproducts.com/iphone-case/iphone-4-case/smartflex-view-for-iphone-4s-4 website, 2012.
The MAC Observer, Inc., ZeroChroma Teatro iPhone 4 Case is Best-in-Class, http://www.macobserver.com/mo/review/zerochroma_teatro_iphone_4_case_is_best-in_class website, Jan. 7, 2011.

\* cited by examiner

DEVICE FOR RETAINING A PORTABLE ELECTRIC COMPONENT

This application claims priority and the benefit as a continuation of U.S. patent application Ser. No. 13/085,598, filed Apr. 13, 2011, now U.S. Pat. No. 8,490,789.

FIELD OF THE INVENTION

This invention relates generally to devices and cases for storing, retaining, holding and protecting portable electronic components such as smart phones.

BACKGROUND OF THE INVENTION

There are many types of portable electronic components and devices including personal digital assistants (PDAs), computers, smartphones, mobile phones, satellite phones, cellular phones, pagers, music players, digital cameras, global positioning systems, and portable game consoles. Typically, these devices are battery powered, so that people can carry and use the devices during their daily lives. Because such portable electronic devices are somewhat fragile and used to carry valuable personal information, many people protect their devices using some form of protective case. Depending on the particular case design, these cases protect the back, side, and front of the devices from scratches, dings, drops, and other physical damage.

Use of protective cases may diminish the ability to effectively use the portable electronic device by, for example, restricting access to the screen, jacks, ports, or other input/output features of the device. In addition, certain cases may diminish the ability of the device to receive and send electromagnetic waves, which carry communication to and from the device. Other forms of devices unduly increase the overall size of the device or make the device more cumbersome to hold, store, or use. A need exists, therefore, for an improved case for portable electronic devices. Preferably, the improved case would protect the device and increase its usefulness.

SUMMARY OF THE INVENTION

According to one aspect of the present invention, a device capable of retaining a portable electronic component includes a frame having a front surface and a rear surface and a handle coupled to the rear surface of the frame, wherein the handle is movable between a retracted position and a plurality of extended positions with respect to the rear surface of the frame along an axis of rotation that is horizontally offset from a vertical centerline of the frame. The rear surface of the frame may include a recessed handle receiving well having a depth capable of housing at least a portion of the handle in its retracted position. The handle may have a depth dimension approximately equal to the handle receiving well of the rear surface of the frame such that the handle in its retracted position is generally flush with the rear surface of the frame.

The frame may also include a circular opening having a ledge, wherein the ledge comprises two or more notches defining a plurality of rotational positions in which the handle may be rotationally retained. In certain embodiments, the device may include a handle retainer having a semicircular segment coupled to a flexible tab via a semicircular hinge, wherein the semicircular hinge of the handle retainer has a convex surface having a plurality of engaging grooves that enable the handle to be positioned in a plurality of extended positions. The handle of the device may include an extension having a slot for receiving the flexible tab of the handle retainer, wherein the extension is upwardly angled such that the center of rotation of the handle is placed down in a direction toward the frame. The slot of the extension may comprise an interior edge that engages the engaging grooves of the handle retainer as the handle is moved from its retracted position to an extended position.

BRIEF DESCRIPTION OF THE FIGURES

These and other features, aspects and advantages of the invention will become more fully apparent from the following detailed description, appended claims, and accompanying drawings, wherein the drawings illustrate features in accordance with an exemplary embodiment of the present invention, and wherein:

DETAILED DESCRIPTION OF THE INVENTION

Figure 1:
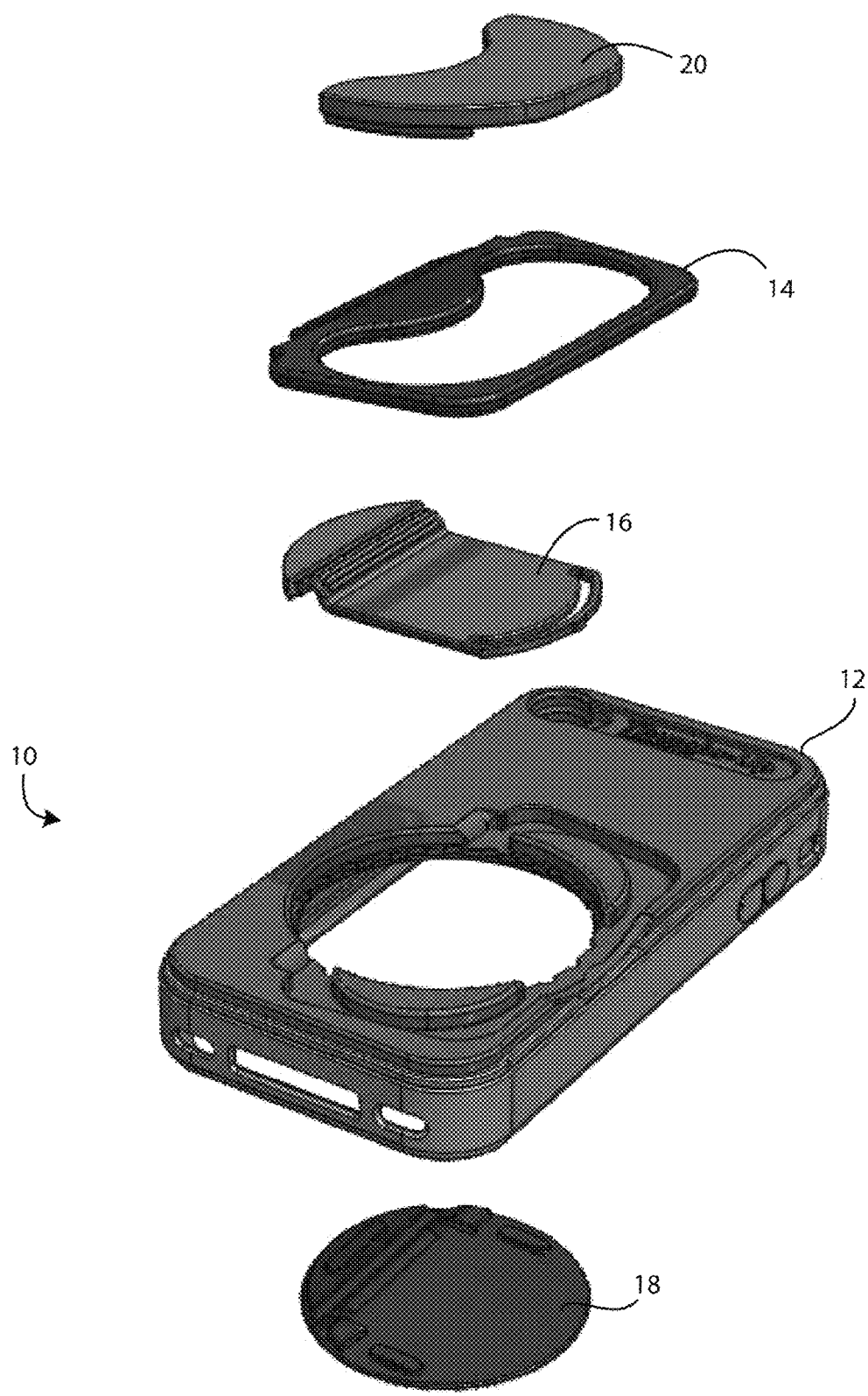
FIG. 1 is an exploded view illustrating the principal components of one embodiment of the device of the present invention.

FIG. 1 illustrates the principal components of one embodiment of the device 10 for retaining a portable electronic component, such as a mobile phone, which include a frame 12, a handle 14, a handle retainer 16, a backing plate 18, and a closure plate 20.

Figure 2:
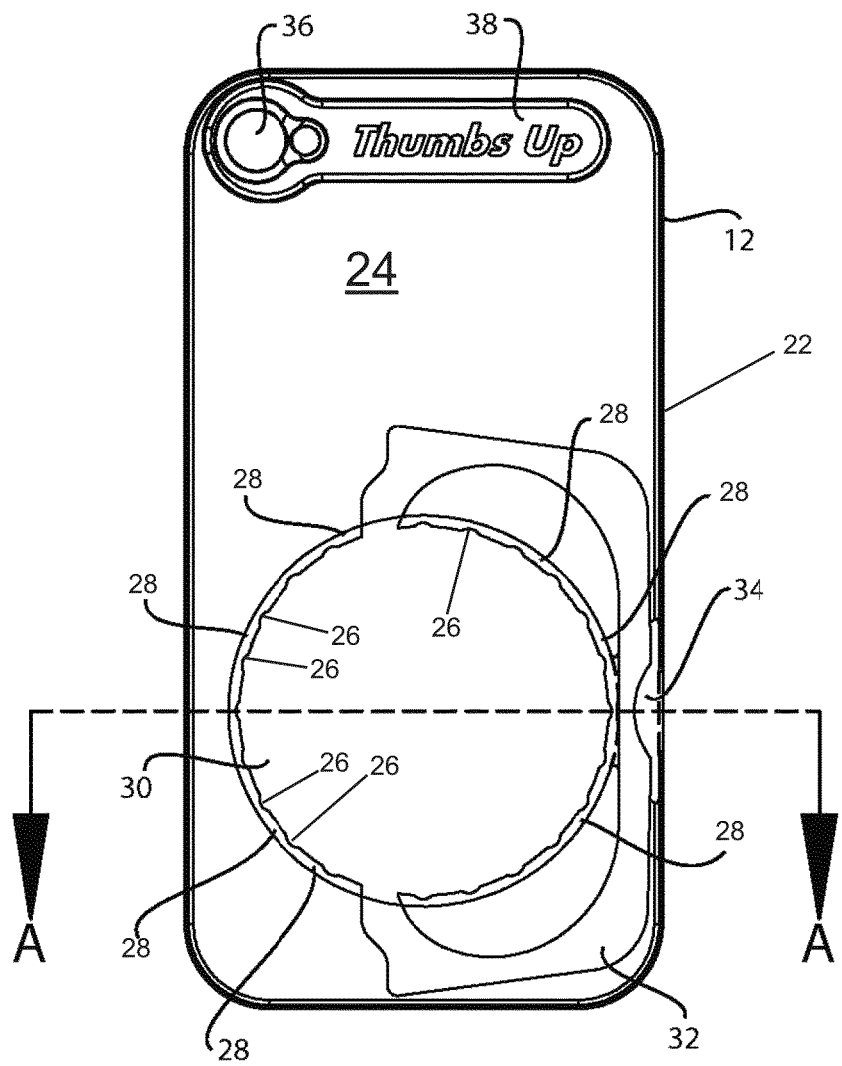
FIG. 2 is front view of one embodiment of the frame of the device.
Figure 3:
FIG. 3 is a perspective view of the front of the frame.
Figure 4:
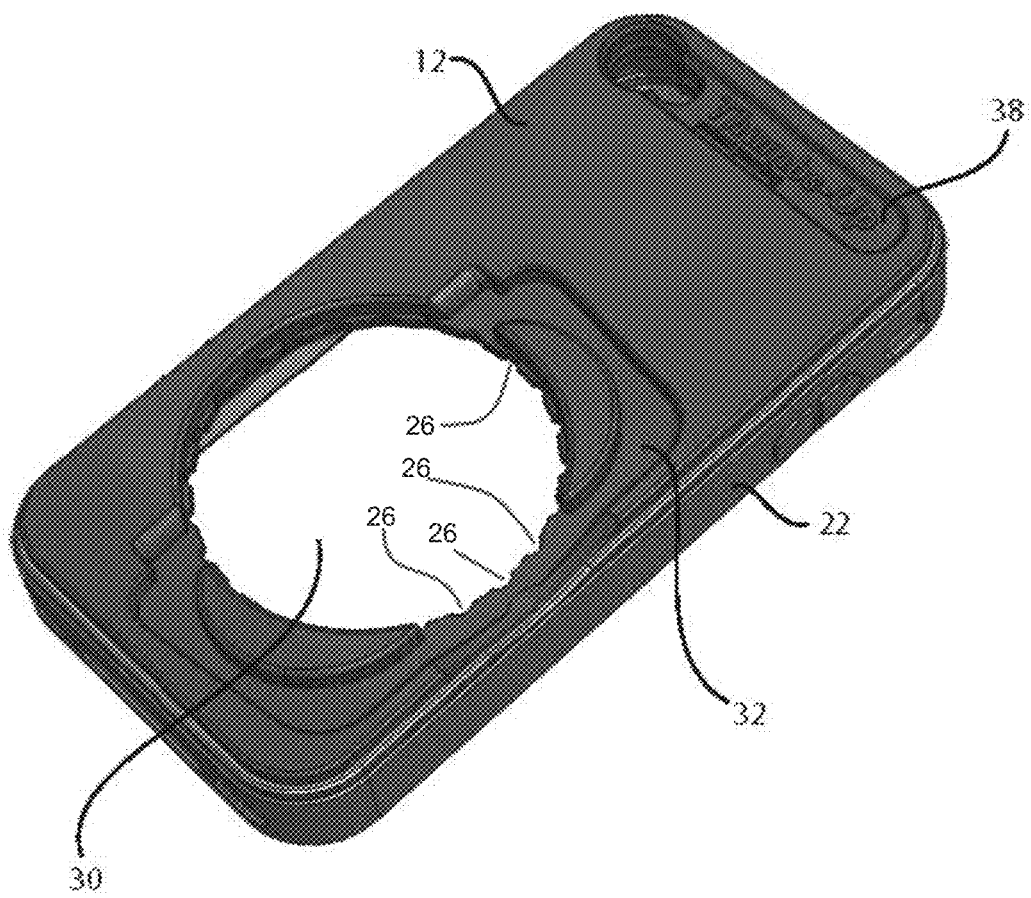
FIG. 4 is a perspective view of the back of the frame.

As illustrated in FIGS. 2 through 4, the frame 12 is preferably designed to wrap around the edge of and retain the electronic component. As such, the frame 12 may be fabricated for use with various cellular phones having different sizes and thicknesses. As illustrated, the frame 12 may be formed in a rectangular shape because almost all cellular phones are formed in rectangular shapes. The rear side of the frame 12 includes a rear surface 24 that contacts the rear surface of the component and preferably includes a sidewall 22 extending around the perimeter of the frame 12 and outwardly from the rear surface 24 forming a cavity into which the component rests. In other embodiments, the device 10 may not include a sidewall extending around the perimeter of the frame 12. In such an embodiment, the device 10 may be secured to the portable electronic component using other conventional means, such as fastened to the component using screws or a pressure adhesive. The frame 12 may be fabricated from a wide variety of materials, including plastic, rubber, leather, silicone, etc.

The frame 12 includes an opening 30 for housing the additional components of the device 10. The opening 30 is preferably circular, thus permitting the handle 14 to rotate within frame 12 as described below. A ledge 28 having a series of notches 26 is formed within the interior of the opening 30. The notches 26 define a plurality of rotational positions in which the handle 14 may be rotationally retained. The ledge 28 is preferably recessed within the opening 30 from both the front and rear surfaces of the frame 12 in order to seat other components of the device 10 on each side of the ledge 28 as described below. The frame 12 also preferably includes a recessed handle receiving well 32 designed to mate with the handle 14. The front surface of the frame may also have a cutout 34 to aid in removing the handle 14 from its retracted position.

The frame 12 may include a number of apertures or openings 36 designed to comport with, and provide access to, any jacks, cameras, buttons, ports, scroll balls, or any other comparable device contained on the mobile phone. The frame 12 may also include a nameplate 38 or other ornamental features.

Figure 5:
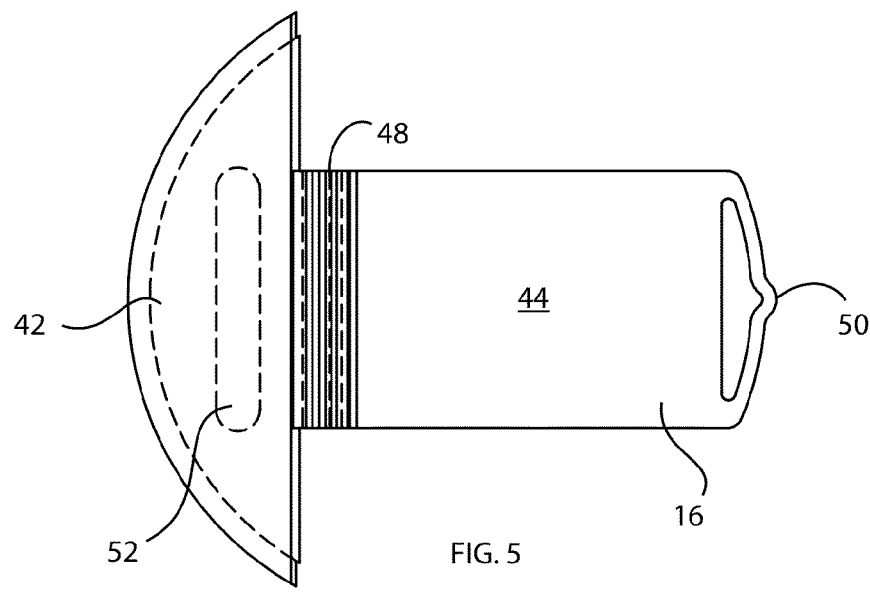
FIG. 5 is a front view of one embodiment of the handle retainer of the device.
Figure 6:
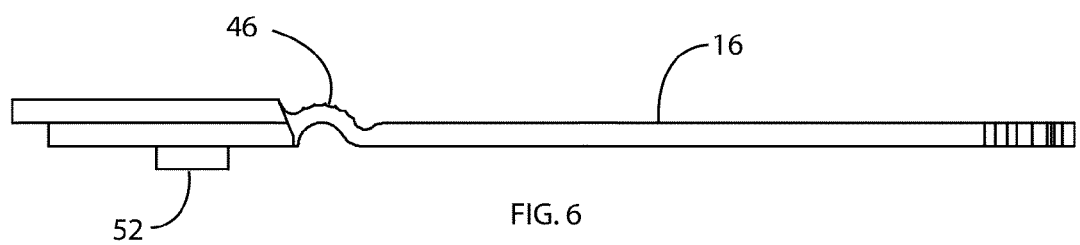
FIG. 6 is a side view of the handle retainer.
Figure 7:
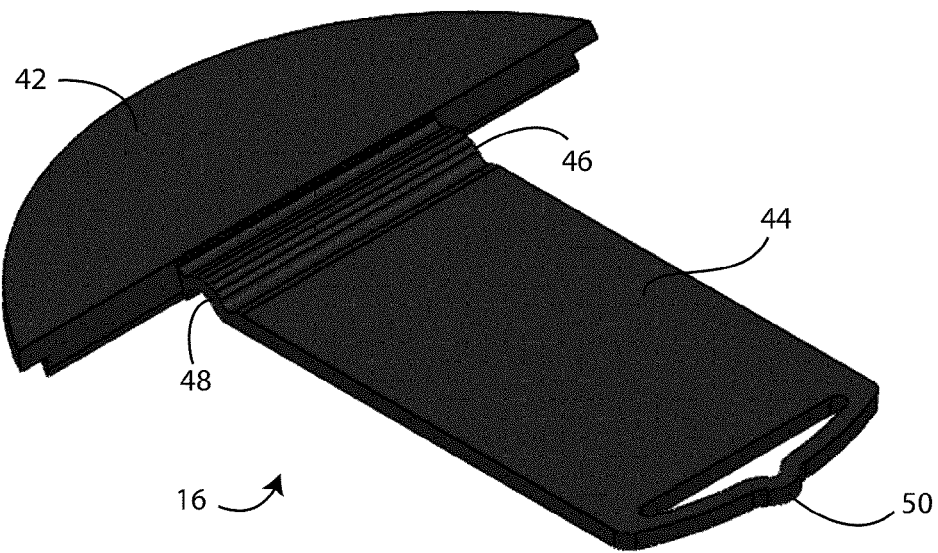
FIG. 7 is a perspective view of the handle retainer.

FIGS. 5-7 illustrate the handle retainer 16, which preferably includes a circular segment 42 coupled to a flexible tab 44 via a semicircular hinge 46. The convex surface of the semicircular hinge 46 includes a series of engaging grooves 48, which enable the handle 14 to be positioned in a plurality of extended positions. The distal end of the flexible tab 44 of the handle retainer 16 includes a protrusion 50 that engages with the notches 26 formed in the ledge 28 of the base. Additionally, the lower surface of the circular segment 42 includes a locking member 52, which locks the handle retainer 16 in place in the closure plate 20.

Figure 8:
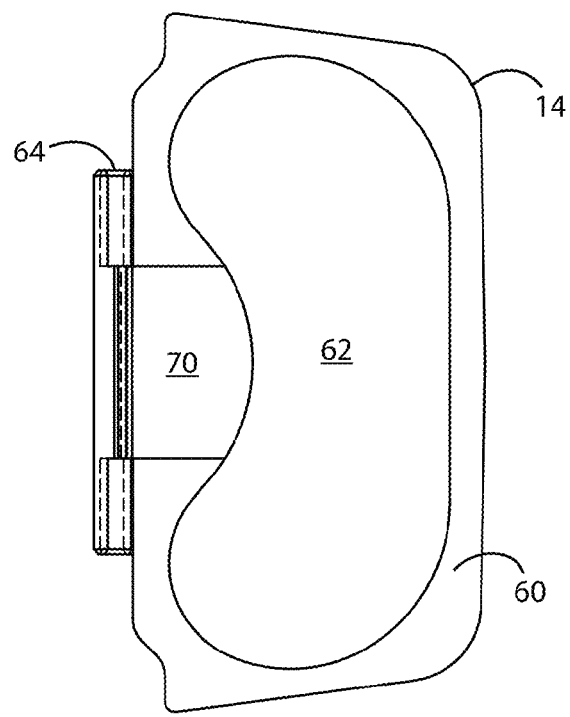
FIG. 8 is a front view of one embodiment of the handle of the device.
Figure 9:
FIG. 9 is a side view of the handle.
Figure 10:
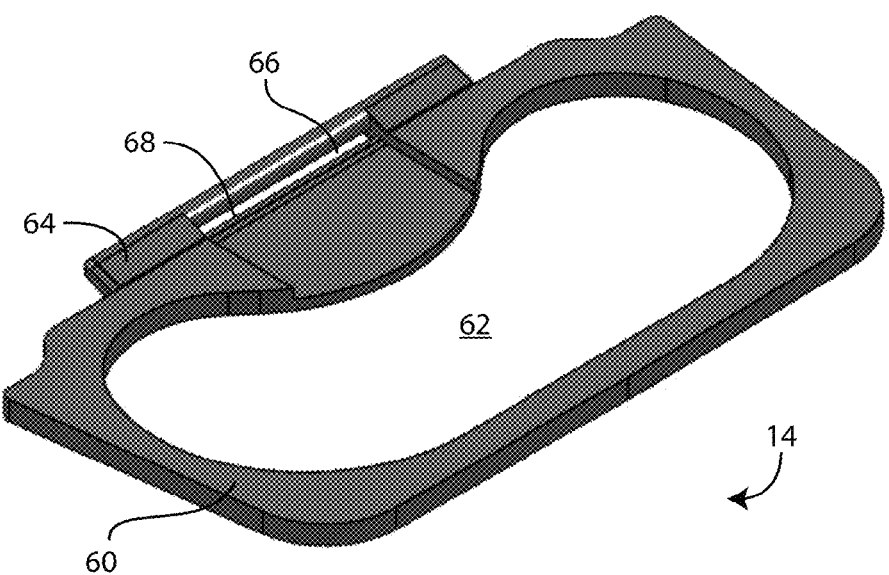
FIG. 10 is a perspective view of the handle.

FIGS. 8-10 illustrate the handle 14 having a perimeter section 60 designed to mate with and be retained in the recessed handle receiving well 32 in a retracted position. The handle 14 includes a finger-receiving opening 62 preferably a shape to accommodate two or three of the user's fingers as the handle 14 is placed in an extended position. The handle 14 includes an extension 64 having a slot 66 for receiving the tab 44 of the handle retainer 16 as described in greater detail below. As illustrated in FIG. 9, the extension 64 is preferably upwardly angled such that the center of rotation of the handle 14 is placed down in a direction toward the frame 12. This feature decreases the overall depth of the device 10. The interior edge 68 of the slot 66 of the extension 64 serves to engage the engaging grooves 48 of the handle retainer 16. The handle 14 further includes a recessed region 70 having a depth approximately the same as the height of the tab 44 of the handle retainer 16.

Figure 11:
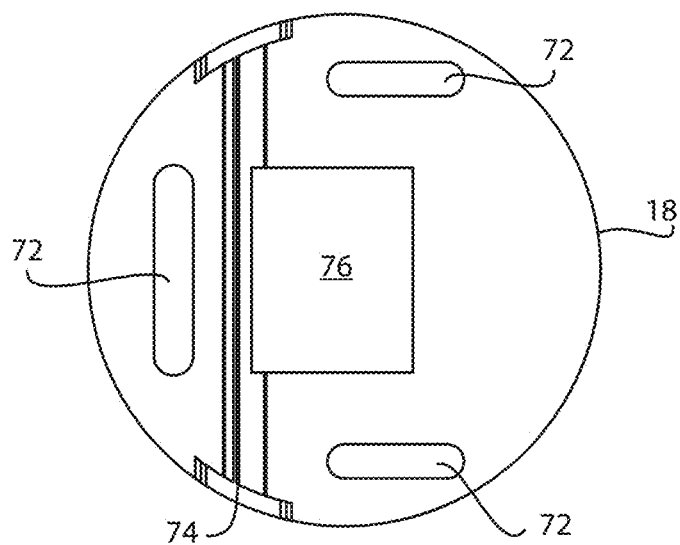
FIG. 11 is a front view of one embodiment of the backing plate of the device.
Figure 12:
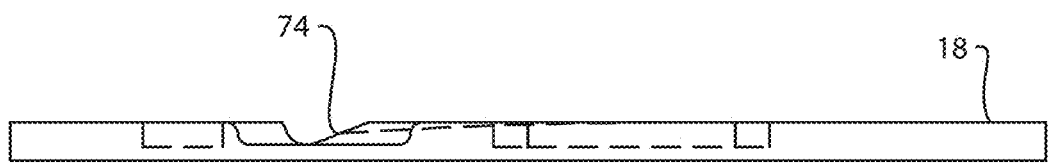
FIG. 12 is a side view of the backing plate.
Figure 13:
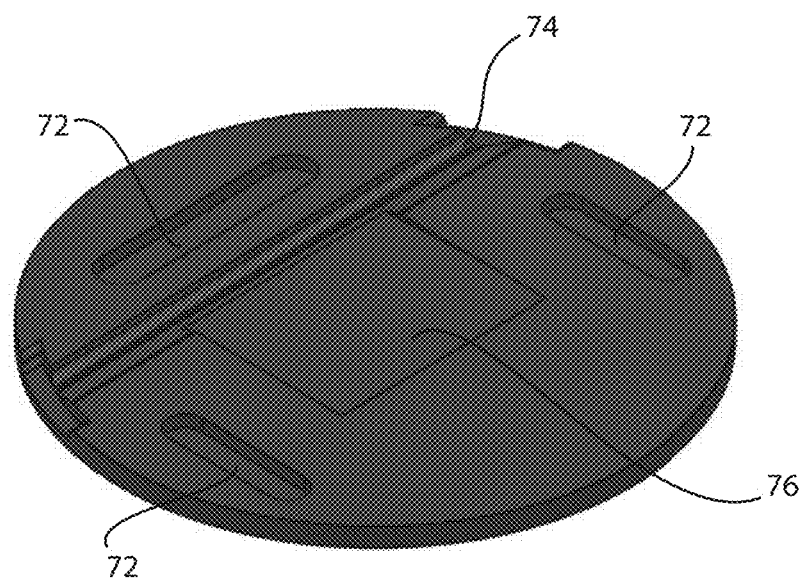
FIG. 13 is a perspective view of the backing plate.

FIGS. 11-13 illustrate one preferred embodiment of the backing plate 18, which is shaped to sit on the ledge 28 of the opening 26 in the frame 12 flush with the rear side of the frame. The backing plate 18 includes three recessed wells 72, each designed to receive locking protrusions formed in the handle retainer (locking member 52), and the locking members 80 in the closure plate 20. The backing plate 18 further includes a channel 74, into which the extension 64 of the handle 14 rotates as the handle 14 is extended from its retracted position. The backing plate 18 further includes a retainer well 76, into which the flexible tab 44 of the handle retainer 16.

Figure 14:
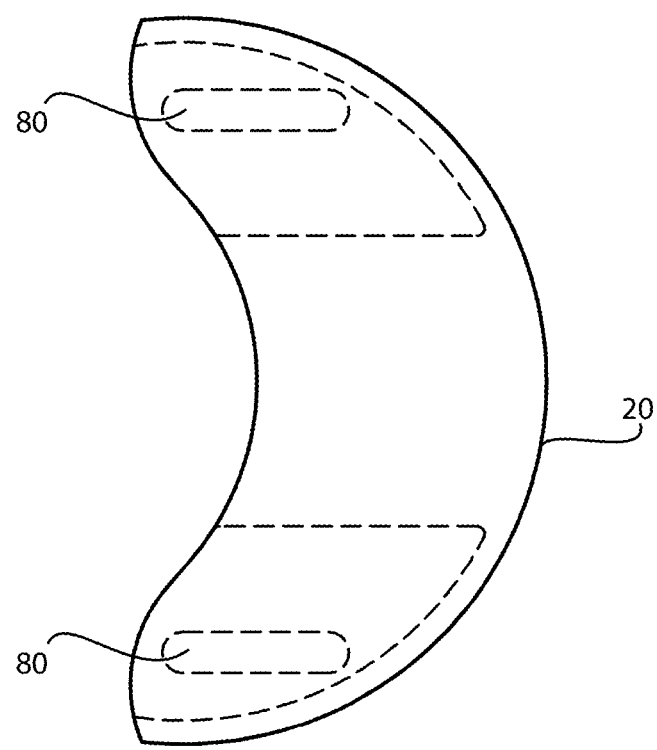
FIG. 14 is a front view of one embodiment of the closure plate of the device.
Figure 15:
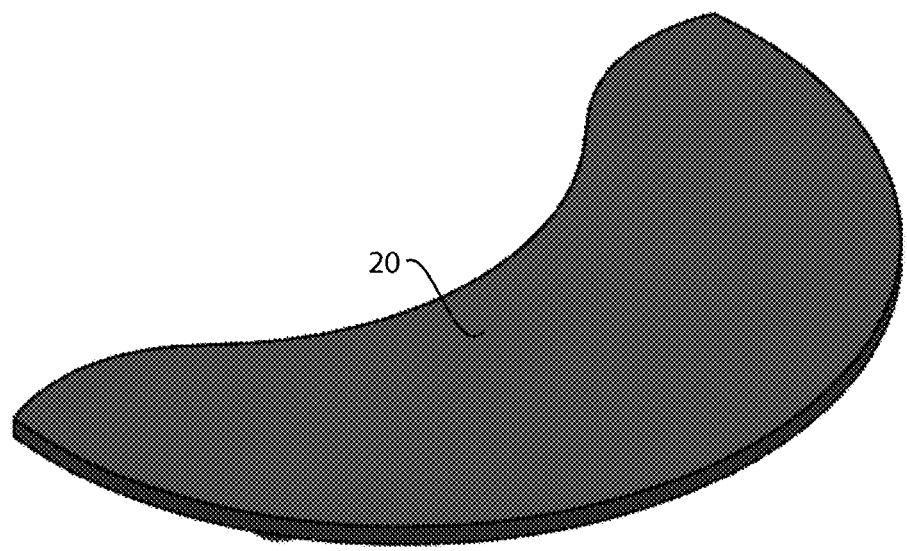
FIG. 15 is a perspective view of the closure plate.

FIGS. 14 and 15 illustrate closure plate 20, which rests on the upper surface of the ledge 28 of the frame 12. The closure plate 20 is preferably shape to mate with the handle 14. The lower surface of the closure plate 20 includes one or two locking members 80, which mate with the recessed wells 72 in the backing plate 18.

In certain embodiments, the device 10 may include the entire frame 12 as depicted in FIGS. 2-4. For example, the device 10 may include the handle 14, the handle retainer 16, the backing plate 18, and the closure plate 20 incorporated directly into the portable electronic component. Alternatively, these components (handle 14, handle retainer 16, backing plate 18, and closure plate 20) may be adhered or attached to the rear surface of the portable electronic component, perhaps using some portion of the frame 12 (e.g., without the sidewall 22). In yet another alternative, these components may be incorporated into or otherwise attached to a more conventional case for the portable electronic component.

Having described each of the individual components of the device 10, we now describe the manner in which the components interact and operate. Backing plate 18 is seated into the opening 30, resting on the lower surface of the ledge 28. The tab 44 of the handle retainer 16 is slid through the slot 66 of the handle 14. The combination of the handle 14 and handle retainer 16 are then place onto the front side of the frame 12 such that the handle 14 rests within the recessed handle receiving well 32 and the circular edge of the circular segment 42 of the handle retainer 16 rests on the front surface of the ledge 28. Finally, the closure plate 20 is seated onto the ledge 28 and the tab 44 such that the locking members 80 are received into the recessed wells 72 of the backing plate 18. These components may then be sealed together, for example, by gluing, thermal bonding, mechanical attachment, or other suitable means. A mobile device such as a phone may then be placed into the rear side of the frame 12.

Figure 16:
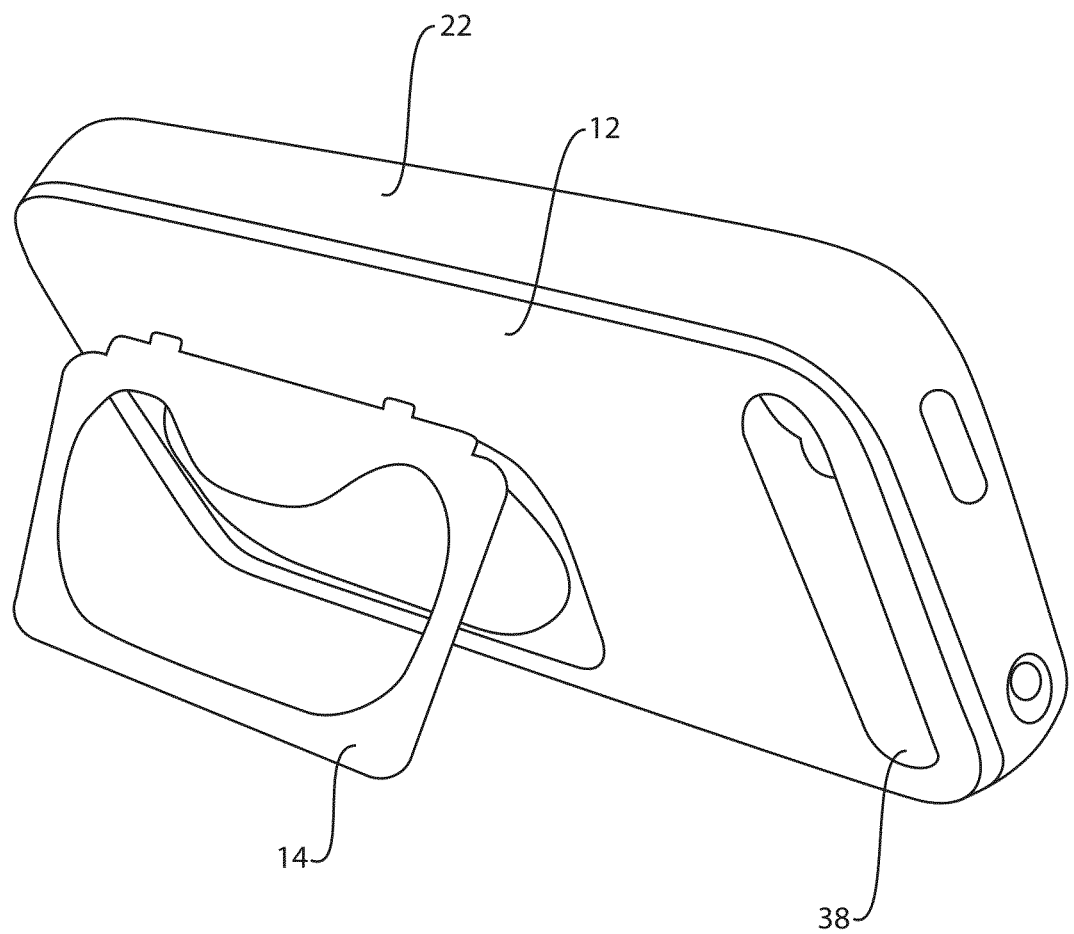
FIG. 16 illustrates the handle of the device in an extended position for landscape viewing mode.

The handle 14 may be moved from its original retracted position (seated into the handle receiving well 32) into one of a plurality of extended positions. By placing one finger under the cutout 34 of the frame 12, the user is able to lift and rotate the handle 14 into an extended position. During this process, the interior edge 68 of the slot 66 of the handle 14 engages with one of the plurality of engaging grooves 48 of the handle retainer 16. The interior edge 68 of the slot 66 and the engaging grooves 48 of the handle retainer 16 engage with each other and form a ratcheting mechanism that can be used to retain the handle 14 in a particular extended position relative to the frame 12. By sequentially extending the handle 14, the interior edge 68 may moved from one engaging groove 48 to another, thereby capturing the handle 14 at one of a plurality of extended positions as shown in FIG. 16. This hinge and ratcheting system provides the mechanism for coupling the handle 14 to the protective device 10 of the present invention and for allowing the handle 14 to open, close, and possibly adjust the angle of the device. As can be seen in a number of the Figures, the axis of rotation of the handle 14 is offset horizontally from the vertical centerline of the device 10 in order to increase the size of the handle 14, including the finger-receiving opening 62.

Moving the handle 14 into an extended positions serves at least one of a number of functions. First, as the handle 14 is extended, the user may place two to three fingers into the finger-receiving opening 62 of the handle while holding his or her hand completely open. As such, the user may hold the phone (either for viewing or near his or her ear for listening) without the need to wrap any portion of the user's fingers around the side of the component. In the case where the component is a cellular phone having its antenna located along the periphery of the phone, the absence of the user's fingers touching the side of the phone, as well as the displacement of the user's palm from contact with the phone, leads to an increase in reception and transmission capability. Additionally, this manner of holding a mobile phone will be more comfortable for a number of users (such as those with arthritis or physical handicaps) as there is no need to bend the fingers to hold the phone in place. Of course, the finger-receiving opening 62 may be formed in a variety of sizes and configurations without departing from the spirit of the invention. Thus, the finger-receiving opening may be two or more separate openings (one for each (or more) fingers or may be sized to accommodate from one to four fingers of varying sizes.

Figure 17:
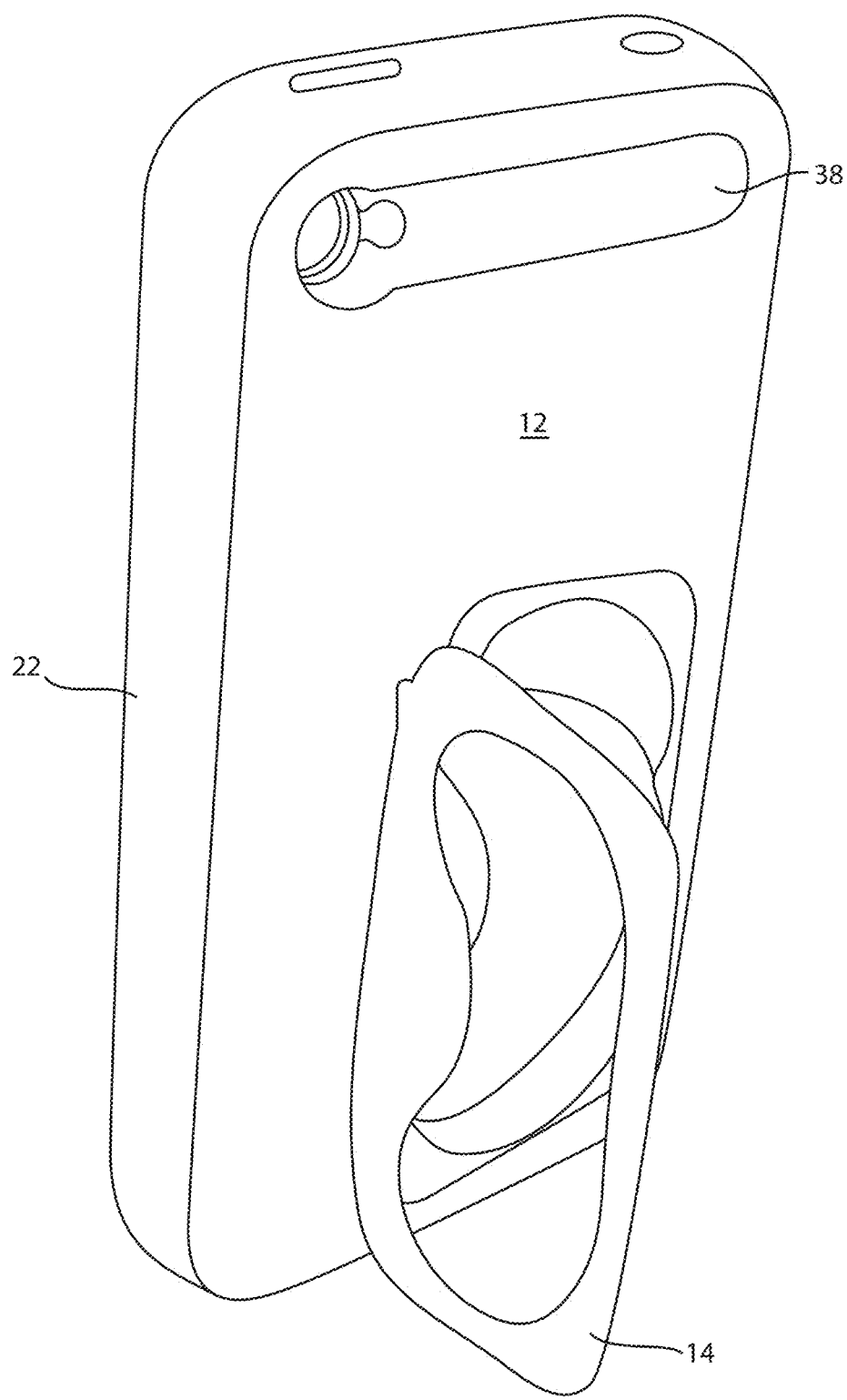
FIG. 17 illustrates the handle of the device in an extended position for portrait viewing mode.
Figure 18:
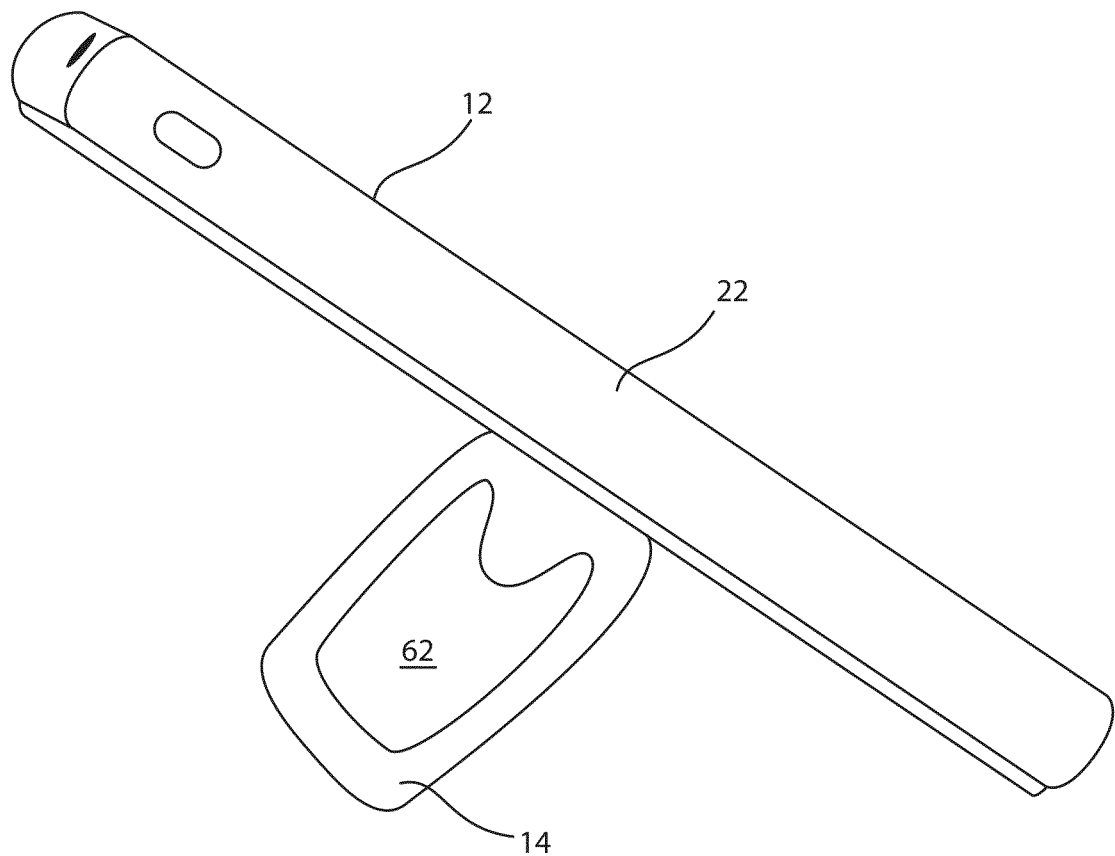
FIG. 18 illustrates the handle of the device in a desktop viewing mode.

The extended handle 14 also permits the device 10 to be used for upright, hands-free viewing of the device within the device 10 at a number of angles in a number of landscape and portrait viewing modes. The handle 14 is both pivotally and rotationally coupled to the remainder of the components. FIG. 16 illustrates an example of landscape viewing mode. FIG. 17 illustrates an example of portrait viewing mode. FIG. 18 illustrates another example of a modified landscape mode—a desktop viewing mode that may be suitable for use in an office environment for reading emails, using the phone in speaker mode and other uses. In order to place the device in one of these viewing modes, the user extends the handle 14 and then rotates the handle to the desired rotational location. As the user rotates the handle, the protrusion 50 of the handle retainer 16 engages with and is retained in one of the plurality of notches 26 in ledge 28 of the frame 12. Thus, the device 10 may include features to both lock the handle 14 in one of a plurality of extended positions and one of a plurality of rotational positions. These various positions may make the device 10 more suitable for communication, viewing, entertainment, etc.

Thus, the handle 12 can be placed in an extended position in which the handle 14 extends outwardly from the frame 12. As the handle 14 is folded inward, the handle 14 can also be placed in a retracted position in which the handle 14 is disposed within the handle receiving well 32 in which the handle 14 in its retracted position has a collapsed thickness that is the same or substantially the same as the thickness of the frame 12 outside of the well 32—the handle 14 is preferably dimensioned to fit within the opening of the well 32 when the handle 14 is in its retracted position.

Although we have described the device 10 as having a number of features, none of these features should be considered critical as the device described herein has a number of novel features that may be incorporated either separately or in certain combinations into a device. In addition, although the device 10 has been described as housing a mobile phone, the device 10 may be used with any type of battery-powered portable electronic device, even such devices that do not necessarily provide telephony functionality. For example, in other implementations, the device may be for a portable or handheld gaming device, portable or palm-sized computer, personal digital assistant, pager, audio player, video player, or camera. Furthermore, the device described herein may be suitable for non-electronic components, such as containers, luggage, etc.

The invention claimed is:

1. A device capable of retaining a portable electronic component, the device comprising:
 a frame comprising a front surface and a rear surface;
 a handle coupled to the rear surface of the frame, wherein the handle is movable between a retracted position and a plurality of extended positions with respect to the rear surface of the frame along an axis of rotation that is horizontally offset from a vertical centerline of the frame;
 wherein the frame further comprises a circular opening having a ledge and wherein the ledge comprises two or more notches defining a plurality of rotational positions in which the handle may be rotationally retained; and
 wherein the ledge is recessed from both the front and rear surface of the frame.

2. The device of claim 1 wherein the front surface of the frame comprises a cavity for retaining the electronic component.

3. The device of claim 1 wherein the rear surface of the frame comprises a recessed handle receiving well having a depth capable of housing at least a portion of the handle in its retracted position.

4. The device of claim 3 wherein the handle has a depth dimension approximately equal to the handle receiving well of the rear surface of the frame such that the handle in its retracted position is generally flush with the rear surface of the frame.

5. The device of claim 4 further comprising a handle retainer having a semicircular segment coupled to a flexible tab via a semicircular hinge.

6. The device of claim 5 wherein the semicircular hinge of the handle retainer comprises a convex surface having a plurality of engaging grooves that enable the handle to be positioned in a plurality of extended positions.

7. The device of claim 6 wherein the handle further comprises an extension having a slot for receiving the flexible tab of the handle retainer.

8. The device of claim 7 wherein the extension is upwardly angled such that the center of rotation of the handle is placed down in a direction toward the frame.

9. The device of claim 7 wherein the slot of the extension comprises an interior edge that engages the engaging grooves of the handle retainer as the handle is moved from its retracted position to an extended position.

10. The device of claim 5 wherein a distal end of the flexible tab of the handle retainer comprises a protrusion that engages with the notches of the ledge of the frame.

11. The device of claim 2 wherein the cavity of the frame is formed from the front surface of the frame and an outwardly extending sidewall extending about the perimeter of the frame.

12. The device of claim 3 wherein the handle comprises a perimeter section designed to mate with and be retained in the recessed handle receiving well in a retracted position.

13. The device of claim 3 wherein the handle comprises a finger-receiving opening in order to accommodate two or three of the user's fingers as the handle is placed in an extended position.

14. The device of claim 1 further comprising a backing plate seated on the lower surface of the ledge in the frame.

15. The device of claim 14 wherein the backing plate further comprises a channel into which the extension of the handle rotates as the handle is extended from its retracted position.

16. A device capable of retaining a component, the device comprising:
 a frame comprising a front surface and a rear surface, wherein the rear surface of the frame comprises a recessed handle receiving well having a depth capable of housing at least a portion of the handle in its retracted position; and
 a handle coupled to the rear surface of the frame,
 wherein the handle further comprises an extension having a slot for receiving the flexible tab of the handle retainer,
 wherein the handle is movable between a retracted position and a plurality of extended positions with respect to the rear surface of the frame along an axis of rotation that is horizontally offset from a vertical centerline of the frame,
wherein the rear surface of the frame comprises a recessed handle receiving well having a depth capable of housing at least a portion of the handle in its retracted position,
wherein the frame further comprises a circular opening having a ledge and wherein the ledge comprises two or more notches defining a plurality of rotational positions in which the handle may be rotationally retained; and
wherein the ledge is recessed from both the front and rear surface of the frame; and
wherein the handle has a depth dimension approximately equal to the handle receiving well of the rear surface of the frame such that the handle in its retracted position is generally flush with the rear surface of the frame.

17. The device of claim 16 further comprising a handle retainer having a semicircular segment coupled to a flexible tab via a semicircular hinge.

18. The device of claim 17 wherein the semicircular hinge of the handle retainer comprises a convex surface having a plurality of engaging grooves that enable the handle to be positioned into the plurality of extended positions.

19. The device of claim 18 wherein the handle further comprises an extension having a slot for receiving the flexible tab of the handle retainer.

20. The device of claim 19 wherein the extension is upwardly angled such that the center of rotation of the handle is placed down in a direction toward the frame.

21. The device of claim 19 wherein the slot of the extension comprises an interior edge that engages the engaging grooves of the handle retainer as the handle is moved from its retracted position to an extended position.

22. The device of claim 17 wherein a distal end of the flexible tab of the handle retainer comprises a protrusion that engages with the notches of the ledge of the frame.

23. The device of claim 16 wherein the handle comprises a perimeter section designed to mate with and be retained in the recessed handle receiving well in a retracted position.

24. The device of claim 16 wherein the handle comprises a finger-receiving opening in order to accommodate two or three of the user's fingers as the handle is placed in an extended position.

25. The device of claim 16 further comprising a backing plate seated on the lower surface of the ledge in the frame.

26. The device of claim 25 wherein the backing plate further comprises a channel into which the extension of the handle rotates as the handle is extended from its retracted position.

* * * * *